United States Patent
Jeong

(10) Patent No.: US 11,787,262 B2
(45) Date of Patent: Oct. 17, 2023

(54) AIR CONDITIONING APPARATUS AND METHOD FOR CONTROLLING THE SAME

(71) Applicants: Hyundai Motor Company, Seoul (KR); Kia Motors Corporation, Seoul (KR)

(72) Inventor: Seong Bin Jeong, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 427 days.

(21) Appl. No.: 16/600,165

(22) Filed: Oct. 11, 2019

(65) Prior Publication Data

US 2020/0369118 A1 Nov. 26, 2020

(30) Foreign Application Priority Data

May 20, 2019 (KR) .................. 10-2019-0058987

(51) Int. Cl.
*B60H 1/00* (2006.01)
*B60H 1/32* (2006.01)

(52) U.S. Cl.
CPC ....... *B60H 1/00764* (2013.01); *B60H 1/3205* (2013.01)

(58) Field of Classification Search
CPC .... B60H 2001/3261; B60H 2001/3263; B60H 2001/3269; B60H 2001/327; B60H 2001/3272; B60H 2001/3273; B60H 1/3222; B60H 1/3226
See application file for complete search history.

(56) References Cited

U.S. PATENT DOCUMENTS

| | | | | |
|---|---|---|---|---|
| 5,924,296 A | * | 7/1999 | Takano | F04B 27/1804 62/133 |
| 6,955,060 B2 | * | 10/2005 | Homan | B60H 1/322 62/133 |
| 2004/0172960 A1 | * | 9/2004 | Nakamura | B60H 1/3211 62/228.1 |
| 2005/0086953 A1 | * | 4/2005 | Sugesawa | B60H 1/3208 62/133 |
| 2020/0018532 A1 | * | 1/2020 | Omori | B60H 1/3216 |

FOREIGN PATENT DOCUMENTS

KR 10-2005-0018218 A 2/2005
KR 10-2014-0109038 A 9/2014

* cited by examiner

*Primary Examiner* — Nelson J Nieves
*Assistant Examiner* — Meraj A Shaikh
(74) *Attorney, Agent, or Firm* — MORGAN, LEWIS & BOCKIUS LLP

(57) ABSTRACT

An air conditioning apparatus may include an evaporator; a temperature sensor configured for detecting a temperature of the evaporator; a compressor compressing a refrigerant transmitted to the evaporator; a clutch selectively allowing power transmission from a vehicle power source to a compressor; and a controller connected to the clutch and configured for controlling the clutch to selectively allow the power transmission according to a result of comparison between a target temperature of the evaporator and a temperature detected by the temperature sensor, in which the controller sets the target temperature based on a vehicle driving state.

8 Claims, 5 Drawing Sheets

| RPM / APS | 1,000 | 2,000 | 3,000 | 4,000 |
|---|---|---|---|---|
| 0% | STAGE 4 | STAGE 4 | STAGE 4 | STAGE 4 |
| 15% | STAGE 4 | STAGE 4 | STAGE 4 | STAGE 4 |
| 37% | STAGE 3 | STAGE 4 | STAGE 4 | STAGE 4 |
| 40% | STAGE 3 | STAGE 3 | STAGE 4 | STAGE 4 |
| 70% | STAGE 2 | STAGE 3 | STAGE 3 | STAGE 3 |
| 85% | STAGE 2 | STAGE 2 | STAGE 2 | STAGE 2 |
| 90% | STAGE 1 | STAGE 1 | STAGE 1 | STAGE 1 |

FIG. 2

| RPM / APS | 1,000 | 2,000 | 3,000 | 4,000 |
|---|---|---|---|---|
| 0% | STAGE 4 | STAGE 4 | STAGE 4 | STAGE 4 |
| 15% | STAGE 4 | STAGE 4 | STAGE 4 | STAGE 4 |
| 37% | STAGE 4 | STAGE 4 | STAGE 4 | STAGE 4 |
| 40% | STAGE 4 | STAGE 4 | STAGE 4 | STAGE 4 |
| 70% | STAGE 3 | STAGE 3 | STAGE 3 | STAGE 3 |
| 85% | STAGE 2 | STAGE 2 | STAGE 2 | STAGE 2 |
| 90% | STAGE 1 | STAGE 1 | STAGE 1 | STAGE 1 |

FIG. 3

| | Compressor Power (cooling performance) | Target temperature of evaporator | Note |
|---|---|---|---|
| STAGE 1 | 40.1% | 15.0 | departure/overtake with top priority |
| STAGE 2 | 59.1% | 10.3 | middle stage of departure/overtake |
| STAGE 3 | 80.3% | 5.6 | early stage of departure/overtake |
| STAGE 4 | 100% | 0.9 | No condition for departure/overtake, cooling performance with top priority |

FIG. 4

| outdoor air temperature | 0℃ | 10℃ | 20℃ | 30℃ | 35℃ | 40℃ | 45℃ | 50℃ ↑ |
|---|---|---|---|---|---|---|---|---|
| Correction constant (A) | 1.5 | 1.4 | 1.3 | 1.0 | 1.0 | 0.9 | 0.8 | 0.7 |

AIR CONDITIONING APPARATUS AND METHOD FOR CONTROLLING THE SAME

CROSS REFERENCE TO RELATED APPLICATION

The present application claims priority to Korean Patent Application No. 10-2019-0058987, filed on May 20, 2019, the entire contents of which is incorporated herein for all purposes by this reference.

BACKGROUND OF THE INVENTION

Field of the Invention

The present invention relates to an air conditioning apparatus and a method for controlling the same, and more particularly, to an air conditioning apparatus, which may appropriately control power of a compressor provided in the air conditioning apparatus of a vehicle when the vehicle performs a departure driving or an overtake driving, and a method for controlling the same.

Description of Related Art

In general, a vehicle may include an air conditioner supplying an interior space of the vehicle with cold or warm air to control a temperature of the interior space, i.e., an air conditioning apparatus.

In general, the air conditioning apparatus may include a compressor, a condenser, an expansion valve and an evaporator provided as a heat exchanger. The compressor, the condenser, the expansion valve and the evaporator may be connected to each other through at least one refrigerant passage. A refrigerant may flow in the compressor, the condenser, the expansion valve and the evaporator through the refrigerant passage; and the cold or warm air may be generated from the air conditioning apparatus depending on a state change of the flowing refrigerant. The generated cold or warm air may be provided to the interior space of the vehicle through a fan.

Here, the compressor may be a component compressing the refrigerant and operated by power provided from a vehicle power source such as an engine. A clutch may be provided to perform or block the power transmission from the vehicle power source to the compressor. The clutch may be controlled by a control signal provided by a controller of the vehicle (e.g., engine management system (EMS)) to perform or block the power transmission to the compressor.

In a conventional air conditioning system, when the vehicle performs a departure driving or an overtake driving, the clutch may block power transmission, and thus reduce a load on the vehicle power source, providing a vehicle wheel with sufficient power. The present conventional control system may be helpful in improving a driving performance of the vehicle. However, the power transmission to the compressor is blocked and thus an interior cooling is impossible, causing a driver to feel uncomfortable in hot weather.

To solve the present problem, developed is a compressor configured for controlling a refrigerant discharge capacity using an electronic control valve depending on a predetermined temperature and a vehicle driving environment. The compressor with the present electronic control valve may control the refrigerant discharge capacity depending on the vehicle driving environment and thereby may change an operation rate of the compressor. Accordingly, when the vehicle performs the departure driving or the overtake driving, the compressor may provide the interior space of the vehicle with the cool air, while providing the vehicle wheel with the sufficient power.

However, such a configuration in which the air conditioning apparatus utilizes the compressor including the electronic control valve may not be a solution. The reason is that the above air conditioning apparatus may not simultaneously provide the driving performance and an interior air conditioning to a vehicle already in driving without the electronic control valve. Furthermore, the compressor including the electronic control valve is relatively expensive, and thus may raise a price of the vehicle even when used in a new vehicle later.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an air conditioning apparatus which may properly control power of a compressor based on a vehicle driving state, rather than blocking the power of the compressor provided in the air conditioning apparatus when the vehicle performs a departure driving or an overtake driving, and a method for controlling the same.

According to an exemplary embodiment in an exemplary embodiment of the present invention, an air conditioning apparatus may include: an evaporator; a temperature sensor configured for detecting a temperature of the evaporator; a compressor compressing a refrigerant transmitted to the evaporator; a clutch selectively allowing power transmission from a vehicle power source to a compressor; and a controller connected to the clutch and configured for controlling the clutch to selectively allow the power transmission according to a comparison between a target temperature of the evaporator and a temperature detected by the temperature sensor, in which the controller sets the target temperature based on a vehicle driving state.

The controller may set the target temperature based on an accelerator pedal depressed amount of the vehicle and a revolutions per minute of the vehicle power source in the vehicle driving state.

The controller may include a data map including the target temperature of the evaporator which is stored in advance depending on the accelerator pedal depressed amount of the vehicle and the revolutions per minute of the vehicle power source, and may set the target temperature by applying detected values of the accelerator pedal depressed amount of the vehicle and the revolutions per minute of the vehicle power source to the data map.

The data map may include a data map for a departure driving in which the vehicle performs the departure driving and a data map for an overtake driving in which the vehicle is on the overtake driving.

The controller may set the target temperature using the data map for a departure driving when a vehicle speed is less than a predetermined reference speed, and using the data map for an overtake driving when the vehicle speed is equal to or greater than the predetermined reference speed.

The controller may correct the target temperature by multiplying the target temperature set using the data map by a correction value depending on an external air temperature, and determine whether or not the clutch is to perform or block the power transmission based on the corrected target temperature.

The correction value may be relatively smaller as the external air temperature is higher.

According to another exemplary embodiment in an exemplary embodiment of the present invention, a method for controlling an air conditioning apparatus may include: receiving detected values of an accelerator pedal depressed amount of a vehicle, a vehicle speed, and a revolutions per minute of a vehicle power source (engine); determining a vehicle driving state based on the detected vehicle speed value, selecting a data map storing a target temperature of an evaporator in advance depending on the accelerator pedal depressed amount of the vehicle and the revolutions per minute of the vehicle power source based on the determined vehicle driving state, and setting the target temperature of the evaporator by applying the detected values of the accelerator pedal depressed amount of the vehicle and the revolutions per minute of the vehicle power source to the selected data map; and determining whether or not a clutch is to perform or block power transmission according to a comparison result between the target temperature of the evaporator and a temperature detected by a temperature sensor.

The data map may include a data map for a departure driving in which the vehicle performs the departure driving and a data map for an overtake driving in which the vehicle is on the overtake driving.

In the setting of the target temperature of the evaporator, the target temperature may be set using the data map for a departure driving when a vehicle speed is less than a predetermined reference speed, and using the data map for an overtake driving when the vehicle speed is equal to or greater than the predetermined reference speed.

The method may further include, after the setting of the target temperature of the evaporator, receiving an external air temperature of the vehicle; and correcting the target temperature by multiplying the target temperature set using the data map by a correction value depending on an external air temperature.

In the determining of whether or not the clutch is to perform or block the power transmission, it may be determined whether or not the clutch is to perform or block the power transmission according to a comparison result between the target temperature corrected in the correcting of the target temperature and a temperature detected by the temperature sensor.

The correction value may be relatively smaller as the external air temperature is higher.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 and FIG. 3 are views each illustrating an example of a target temperature of an evaporator set by a controller in an air conditioning apparatus according to an exemplary embodiment in an exemplary embodiment of the present invention.

FIG. 4 is a view exemplarily illustrating a relationship between a power of a compressor and a target temperature of an evaporator in an air conditioning apparatus according to an exemplary embodiment in an exemplary embodiment of the present invention.

Figure 1:
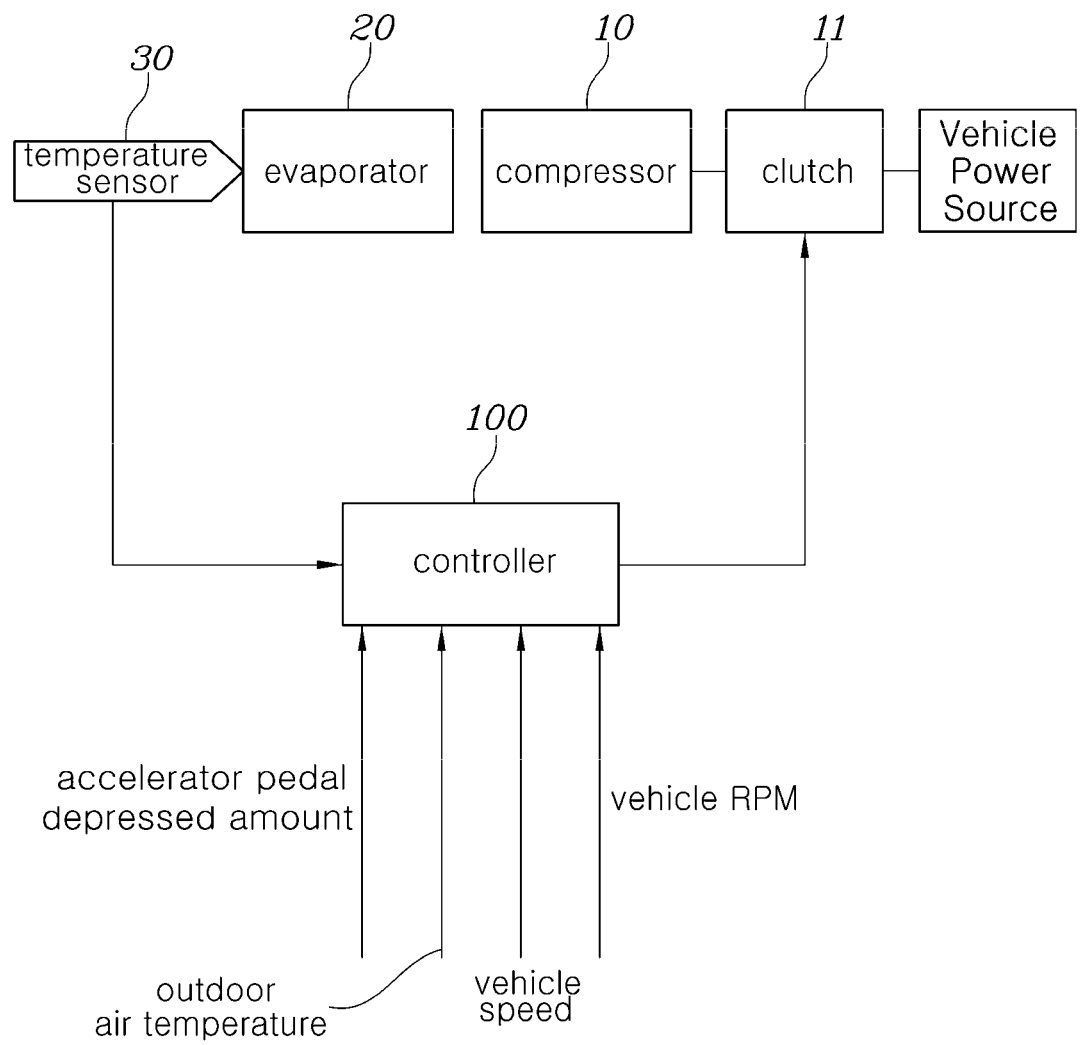
FIG. 1 is a block diagram illustrating an air conditioning apparatus according to an exemplary embodiment in an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an air conditioning apparatus and a method for controlling the same according to embodiments in an exemplary embodiment of the present invention are described with reference to the accompanying drawings.

FIG. 1 is a block diagram illustrating an air conditioning apparatus according to an exemplary embodiment in an exemplary embodiment of the present invention.

Referring to FIG. 1, an air conditioning apparatus according to an exemplary embodiment in an exemplary embodiment of the present invention may include: an evaporator 20; a temperature sensor 30 detecting a temperature of the evaporator 20; a compressor 10 compressing a refrigerant transmitted to the evaporator; a clutch 11 performing or blocking the power transmission from a vehicle power source to a compressor 10; and a controller 100 controlling the clutch 11 according to a comparison result between a target temperature of the evaporator 20 and a temperature detected by the temperature sensor 30.

In general, an air conditioning apparatus provided in a vehicle may include the compressor 10, the clutch 11, a condenser, the evaporator 20, a passage connecting the compressor 10 and the condenser, a passage connecting the condenser and the evaporator 20, and a passage connecting the evaporator 20 and the compressor 10. The compressor 10, the condenser, the evaporator 20 and a plurality of passages may be connected to each other to allow the refrigerant to flow in a predetermined direction thereof.

The compressor 10 may be supplied with a refrigerant in a low-pressure gaseous state through the passage connected to the evaporator 20, and may convert the supplied refrigerant into a refrigerant in a high-temperature and high-pressure gaseous state. The refrigerant in a high-temperature and high-pressure gaseous state may be transmitted to the condenser through the passage connected to the condenser.

The clutch 11 may be connected to the compressor 10 and controlled by the controller 100 to transmit power of the vehicle power source (e.g., engine) to the compressor 10 to operate the compressor 10. Alternatively, the clutch 11 may block the power transmission from the vehicle power source to the compressor 10 to stop an operation of the compressor 10.

Although not illustrated, the condenser may cool and thus liquefy the refrigerant in a high-temperature and high-pressure gaseous state, which is transmitted from the compressor 10, into a refrigerant in a liquid state. In an external heat exchanger, the refrigerant may release heat to the outside, while being liquefied, and thus a temperature of the refrigerant may be lowered. The refrigerant cooled in the condenser may be transmitted to the evaporator 20 through the passage connected to the evaporator 20.

The evaporator 20 may be provided to discharge the cold air using the refrigerant provided from the condenser. The evaporator 20 may include a passage through which the refrigerant flows, and the passage may be implemented using a tube formed of a metal or a synthetic resin material. The tube may be bent in multiple turns to have a zig-zag shape.

In detail, while the refrigerant passes through the evaporator 20, the refrigerant may absorb latent heat and evaporate, lowering a temperature of air around the evaporator 20. Accordingly, the cold air may be generated around the evaporator 20, and the generated cold air may be supplied to an interior space of the vehicle through a fan.

The refrigerant discharged from the evaporator 20 may be transmitted back to the compressor 10 through the passage connected to the compressor 10.

The controller 100 may perform an electronic control of various components provided in the vehicle. The controller 100 may include a central processing unit (CPU), a microcontroller unit (MCU), an electronic control unit (ECU) or the like. The CPU, the MCU, the ECU or the like may be implemented using one or more semiconductor chips and associated components. Furthermore, the CPU, the MCU, the ECU or the like may perform processing for various operations of the vehicle based on a program or data which is embedded or input by a user. The CPU, the MCU, the ECU or the like may be installed at any position inside the vehicle depending on a designer's choice. For example, the CPU, the MCU, the ECU or the like may be installed on a board, and the board may be mounted in a space between a dashboard and an engine compartment.

In an exemplary embodiment in an exemplary embodiment of the present invention, the controller 100 may include an engine management system controlling an operation of the clutch 11 which is implemented as a separate control unit in a real vehicle, and an air conditioning apparatus controller configured for controlling the air conditioning apparatus. The controller 100 may be operated by coordinated control of the engine management system and the air conditioning apparatus controller.

In an exemplary embodiment in an exemplary embodiment of the present invention, the controller 100 may compare the target temperature of the evaporator 20 with an actual temperature of the evaporator 20 detected by the temperature sensor 30 (hereinafter, a detection temperature) to determine whether or not the clutch 11 is to perform or block the power transmission.

In general, the air conditioning apparatus of the vehicle may control the evaporator 20 to have the target temperature immediately before freezing (e.g., 1 to 3 deg. C.) to prevent freezing of the evaporator 20 and to exhibit maximum cooling performance of the vehicle. The controller 100 may control the clutch 11 to block the power transmission to the compressor 10 when the detection temperature is lower than the target temperature, and may control the clutch 11 to transmit the power to the compressor 10 when the detection temperature is higher than the target temperature. Naturally, a constant hysteresis may be used when the clutch 11 is controlled as such. For example, the controller 100 may control the clutch 11 to transmit the power to the compressor 10 when the detection temperature is higher than a value obtained by the target temperature-plus-a preset margin temperature.

Furthermore, the controller 100 may determine whether or not the vehicle performs the departure driving or the overtake driving based on a vehicle driving state and set the target temperature based on a result of the determination. The controller 100 may determine whether or not the vehicle performs the departure driving or the overtake driving based on an accelerator pedal depressed amount of the vehicle detected by a vehicle accelerator pedal position sensor, a vehicle speed detected by a vehicle speedometer and a revolutions per minute (RPM) of the vehicle power source detected by an RPM sensor which detects the RPM of the vehicle power source, e.g., the engine.

When it is determined that the vehicle performs the departure driving or the overtake driving, the controller 100 may set the target temperature different for each of a plurality of sections divided based on the APS and the RPM of the vehicle power source.

FIG. 2 and FIG. 3 are views each illustrating an example of a target temperature of an evaporator set by a controller in an air conditioning apparatus according to an exemplary embodiment in an exemplary embodiment of the present invention. Furthermore, FIG. 4 is a view exemplarily illustrating a relationship between power of a compressor and a target temperature of an evaporator in an air conditioning apparatus according to an exemplary embodiment in an exemplary embodiment of the present invention.

The controller 100 may include data maps for controlling the compressor as illustrated in FIG. 2 and FIG. 3. The controller 100 may use the data map as illustrated in FIG. 2 when the vehicle speed is less than a predetermined reference speed, and may use the data map as illustrated in FIG. 3 when the vehicle speed is equal to or greater than the predetermined reference speed.

As illustrated in FIG. 2 and FIG. 3, each data map may have a plurality of sections divided based on the APS and the RPM of the vehicle power source, and may use a target temperature different for each section depending on demand power of the vehicle wheel required for the departure driving or the overtake driving of the vehicle.

A table of FIG. 4 illustrates cases in which a total of four different target temperatures are respectively used in four stages. Stage 1 is a case in which the demand power of the vehicle wheel required for the departure driving or the overtake driving of the vehicle is greatest, and stage 4 is a case in which the cooling performance of the vehicle may be maximized when it is determined that the vehicle performs neither the departure driving nor the overtake driving.

For example, stage 1 in the table of FIG. 4 is a stage in which the demand power of the vehicle wheel required for the departure driving or the overtake driving of the vehicle is greatest, and thus the target temperature of the evaporator is set to the highest level to minimize the cooling performance of the air conditioning apparatus. Next, stage 2 in the table of FIG. 4 is a middle stage of the departure driving or the overtake driving of the vehicle, in which the demand power of the vehicle wheel required for the departure driving or the overtake driving of the vehicle is smaller than that in stage 1 and thus the target temperature in stage 2 may be set to be lower than the target temperature in stage 1.

Furthermore, stage 3 in the table of FIG. 4 is an early stage of the departure driving or the overtake driving of the vehicle, in which the demand power of the vehicle wheel required for the departure driving or the overtake driving of the vehicle is smaller than that in stage 2 and thus the target temperature in stage 3 may be set to be lower than the target temperature in stage 2. Finally, stage 4 in the table of FIG. 4 is a stage, in which the cooling performance of the vehicle may be maximized on condition that the vehicle performs neither the departure driving nor the overtake driving and thus the target temperature in stage 4 may be set to be lower than the target temperature in stage 3 (i.e., the target temperature for preventing freezing of the evaporator).

Figures 5, 6:
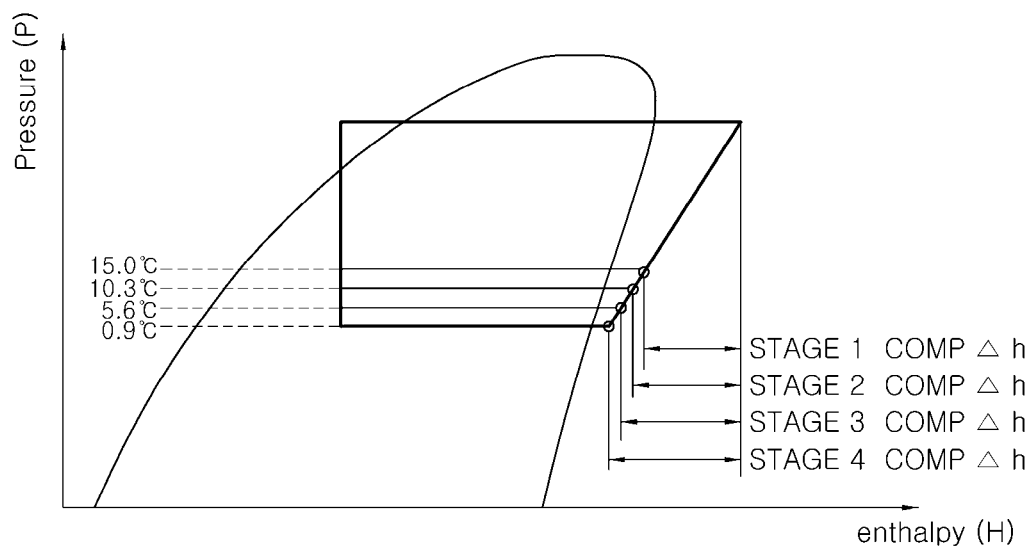
FIG. 5 is a Mollier diagram illustrating an example of setting the relationship between the target temperature and the power of the compressor as illustrated in FIG. 4.
FIG. 6 is a view exemplarily illustrating an example of a correction value used when setting a target temperature in an air conditioning apparatus according to an exemplary embodiment in an exemplary embodiment of the present invention.

The target temperature of the evaporator 20 set in the table of FIG. 4 may be determined using an experimental technique in advance considering the temperature of the evaporator 20 and dynamic performance of the compressor 10. In the instant case, a Mollier diagram as illustrated in FIG. 5 may be used. FIG. 5 is a Mollier diagram illustrating an example of setting the relationship between the target temperature and the power of the compressor as illustrated in FIG. 4.

For example, in stage 1 in which the demand power of the vehicle wheel required for the departure driving or the overtake driving of the vehicle is greatest, the target temperature of the evaporator 20 may be set to 15.0° C. to make the compressor operate with about 40.1% of maximum power thereof. That is, considering the experimental technique or the dynamic performance of the compressor 10 in advance, the temperature of the evaporator 20 may be found for making the power of the compressor 10 to be 40.1% of the maximum power thereof and the found temperature of the evaporator 20 may be set to the target temperature of stage 1. The stages may be set by plotting a line corresponding to a compression process on the Mollier diagram as illustrated in FIG. 5 to correspond to the dynamic performance of the compressor.

FIG. 2, FIG. 3, FIG. 4 and FIG. 5 illustrate an example of performing control by dividing the target temperature into four stages depending on the demand power of the vehicle wheel. This is only an example provided for the understanding of the present invention, and the present invention is not limited thereto. Also, it is very obvious to those skilled in the art that the target temperature may be divided into multiple stages rather than in four stages.

FIG. 6 is a view exemplarily illustrating an example of a correction value used when setting a target temperature in an air conditioning apparatus according to an exemplary embodiment in an exemplary embodiment of the present invention.

As illustrated in FIG. 6, the correction value used when setting the target temperature may be set to a smaller value as an external air temperature is higher. As explained in FIG. 2, FIG. 3 and FIG. 4, the correction value set as in FIG. 6 is a value for correcting the target temperature set based on a vehicle driving state, and the controller 100 may multiply the target temperature set using the data map of FIG. 2 and FIG. 3 by the correction value to finally derive the target temperature of the evaporator 20 for controlling the compressor 10.

The higher the external air temperature, the higher the driver's demand for the air conditioning performance of the vehicle. Therefore, when the external air temperature is high, it is desirable to meet driver's demand for the air conditioning performance by setting the target temperature relatively lower than when the external air temperature is low. To the contrary, when the external air temperature is low, the target temperature may be set relatively higher than when the external air temperature is high, relatively reducing the air conditioning performance and improving the dynamic performance of the vehicle in the departure driving or in the overtake driving.

Figure 7:
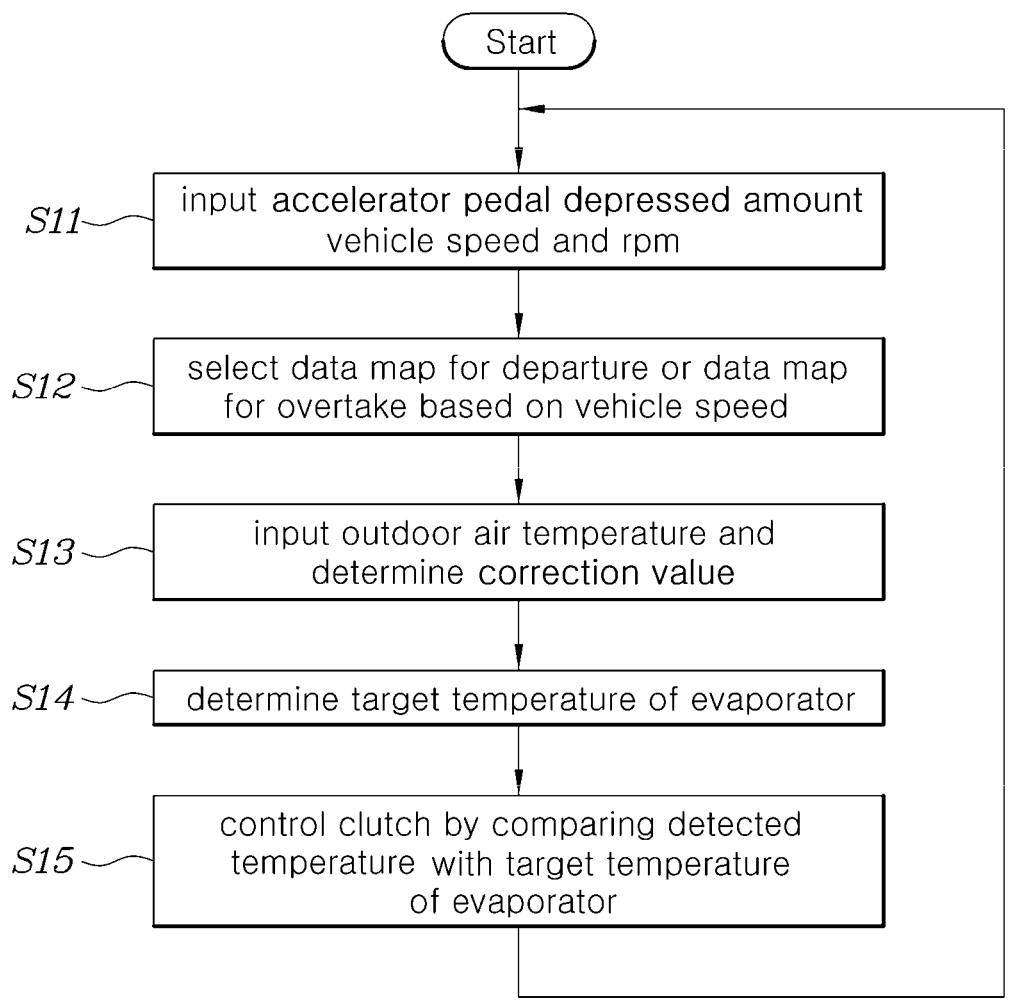
FIG. 7 is a flowchart illustrating a method for controlling an air conditioning apparatus according to an exemplary embodiment in an exemplary embodiment of the present invention.

FIG. 7 is a flowchart illustrating a method for controlling an air conditioning apparatus according to an exemplary embodiment in an exemplary embodiment of the present invention.

The method for controlling the air conditioning apparatus as illustrated in FIG. 7 is a controlling method performed in a controller of an air conditioning apparatus according to various embodiments in an exemplary embodiment of the present invention as described above. First, a controller 100 may receive an accelerator pedal depressed amount of a vehicle, a vehicle speed and a revolutions per minute (RPM) of a vehicle power source (e.g., engine) (S11).

Next, the controller 100 may select a target temperature data map stored in advance to control a compressor 10 based on the input vehicle speed (S12).

For example, in step S12, the controller 100 may select a data map for a departure driving as illustrated in FIG. 2 when the vehicle speed is less than a predetermined reference speed, and may select a data map for an overtake driving as illustrated in FIG. 3 when the vehicle speed is equal to or greater than the predetermined reference speed.

Furthermore, in step S12, the controller 100 may set a target temperature of an evaporator 20 for controlling the compressor 10 by applying the APS input and the RPM of the vehicle power source to the selected data map.

Next, the controller 100 may then receive information on an external air temperature of the vehicle from an external air temperature sensor of the vehicle and as illustrated in FIG. 6, may set a correction value in advance for the external air temperature (S13).

Next, the controller 100 may multiply the target temperature set based on a vehicle driving state (the APS and the RPM of the vehicle power source) in step S12 by the correction value set in step S13 to finally determine the target temperature of the evaporator 20 (S14).

Next, the controller 100 may compare the target temperature finally determined in step S14 with a detection temperature of the evaporator 20 detected by a temperature sensor 30 and thus control the clutch to perform or block power transmission, controlling power of the compressor 10.

As described above, according to the air conditioning apparatus and the method for controlling the same according to various embodiments in an exemplary embodiment of the present invention, when the vehicle is required to perform the departure driving or the overtake driving, the power of the compressor may be indirectly controlled by changing the target temperature of the evaporator used to control the temperature of the evaporator, rather than simply using the clutch to block the power transmission to the compressor. Therefore, by controlling the power of the compressor depending on the demand power of the vehicle wheel required for the departure driving or the overtake driving of the vehicle, the air conditioning apparatus in an exemplary embodiment of the present invention may secure both the driving performance of the vehicle and a certain level of the interior cooling performance of the vehicle.

Furthermore, the air conditioning apparatus and the method for controlling the same according to various embodiments in an exemplary embodiment of the present invention may change the target temperature of the evaporator used for controlling the compressor depending on the external air temperature, and thus may reflect the driver's demand for the interior cooling depending on the external air temperature, providing a more comfortable driving environment to the driver.

Effects obtainable in an exemplary embodiment of the present invention are not limited to the effects mentioned above. That is, other effects that are not mentioned may be obviously understood by those skilled in the art to which an exemplary embodiment of the present invention pertains from the following description.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:
1. An air conditioning apparatus comprising:
an evaporator;
a temperature sensor configured for detecting a temperature of the evaporator;
a compressor compressing a refrigerant transmitted to the evaporator;
a clutch selectively allowing power transmission from a power source of a vehicle to the compressor; and
a controller connected to the clutch and configured for controlling the clutch to selectively allow the power transmission according to a result of comparison between a target temperature of the evaporator and the temperature detected by the temperature sensor,
wherein the controller is configured to set the target temperature based on a driving state of the vehicle,
wherein the power source includes an engine of the vehicle,
wherein the controller includes a data table including target temperatures of the evaporator which are stored in advance depending on an accelerator pedal depressed amount range of the vehicle and a revolutions per minute (RPM) range of the engine, and
wherein the controller is configured to set the target temperature from the data table, wherein the target temperature is based on the accelerator pedal depressed amount range of the vehicle and the RPM range of the engine, and
wherein the data table includes:
a first data table related to a departure driving in which the vehicle is on the departure driving; and
a second data table related to an overtake driving in which the vehicle is on the overtake driving,
wherein the controller is configured to set the target temperature,
by using the first data table for the departure driving, upon determining that a vehicle speed is less than a predetermined reference speed, and
by using the second data table for the overtake driving, upon determining that the vehicle speed is equal to or greater than the predetermined reference speed,
wherein each of the first data table and the second data table has a plurality of target temperatures specified based on the accelerator pedal depressed amount range of the vehicle and the RPM range of the engine, and
wherein the each of the first data table and the second data table uses the target temperatures differently for the departure driving or the overtake driving of the vehicle.

2. The air conditioning apparatus of claim 1,
wherein the controller is configured to set the target temperature based on the accelerator pedal depressed amount range of the vehicle and the revolutions per minute (RPM) range of the engine in the driving state of the vehicle.

3. The air conditioning apparatus of claim 1,
wherein the controller is configured to correct the target temperature by multiplying the target temperature set using the data table by a correction value depending on a detected external air temperature, and
wherein the controller is configured to determine when the clutch is to selectively allow the power transmission based on the corrected target temperature.

4. The air conditioning apparatus of claim 3, wherein the correction value is set to decrease as the detected external air temperature increases.

5. A method of controlling an air conditioning apparatus including an evaporator, a temperature sensor configured for detecting a temperature of the evaporator, a compressor compressing a refrigerant transmitted to the evaporator, a clutch selectively allowing power transmission from a power source of a vehicle to the compressor, and a controller connected to the clutch, the method comprising:
receiving, by the controller, detected values of an accelerator pedal depressed amount of the vehicle, a vehicle speed, and a revolutions per minute (RPM) of an engine in the vehicle;
determining, by the controller, a driving state of the vehicle based on the detected value of the vehicle speed, selecting a data table including target temperatures of the evaporator, which are stored in advance depending on an accelerator pedal depressed amount range of the vehicle and an RPM range of the engine based on the determined driving state of the vehicle, and setting a target temperature of the evaporator by applying the detected values of the accelerator pedal depressed amount of the vehicle and the RPM of the engine to the selected data table; and determining, by the controller, of when the clutch is to selectively allow the power transmission according to a result of comparison between the target temperature of the evaporator and the temperature detected by the temperature sensor; and controlling, by the controller, the clutch to selectively allow the power transmission according to the result of comparison between the target temperature of the evaporator and the temperature detected by the temperature sensor, wherein the data table includes:

a first data table related to a departure driving in which the vehicle is on the departure driving; and a second data table related to an overtake driving in which the vehicle is on the overtake driving, wherein in the setting of the target temperature of the evaporator, the target temperature is set by using the first data table for the departure driving, upon determining that the vehicle speed is less than a predetermined reference speed, and by using the second data table for the overtake driving, upon determining that the vehicle speed is equal to or greater than the predetermined reference speed, wherein each of the first data table and the second data table has a plurality of target temperatures specified based on the accelerator pedal depressed amount range of the vehicle and the RPM range of the engine, and wherein the each of the first data table and the second data table uses the target temperatures differently for the departure driving or the overtake driving of the vehicle.

6. The method of claim 5, further including:

after the setting of the target temperature of the evaporator, detecting an external air temperature of the vehicle; and correcting the target temperature by multiplying the target temperature set using the data table by a correction value depending on the detected external air temperature.

7. The method of claim 6, wherein in the determining of when the clutch is to selectively allow the power transmission, the clutch is determined to selectively allow the power transmission according to the result of comparison between the target temperature corrected in the correcting of the target temperature and the temperature detected by the temperature sensor.

8. The method of claim 6, wherein the correction value is set to decrease as the detected external air temperature increases.

* * * * *